United States Patent [19]

Brown

[11] 4,210,040

[45] Jul. 1, 1980

[54] APPARATUS FOR TURNING MACHINES AND THE LIKE FOR SIMULTANEOUS AXIAL AND RADIAL PROFILING OF WORK

[75] Inventor: Ivan R. Brown, Horseheads, N.Y.

[73] Assignee: Hardinge Brothers, Inc., Elmira, N.Y.

[21] Appl. No.: 974,001

[22] Filed: Dec. 28, 1978

[51] Int. Cl.² ............................................... B23B 3/28
[52] U.S. Cl. .................................................. 82/19
[58] Field of Search ......................... 82/19, 14 R, 14 C

[56] References Cited

U.S. PATENT DOCUMENTS

| 2,092,202 | 9/1937 | Bennett | 82/19 |
|---|---|---|---|
| 2,146,774 | 2/1939 | Snader | 82/19 |
| 3,391,587 | 7/1968 | Van Denkieboom | 82/19 |
| 3,869,974 | 3/1975 | Van Denkieboom | 82/19 |
| 3,983,770 | 10/1976 | Skrentner | 82/19 |

*Primary Examiner*—Harrison L. Hinson
*Attorney, Agent, or Firm*—Shlesinger, Arkwright, Garvey & Dinsmore

[57] ABSTRACT

In a turning machine or the like having a tool for simultaneous axial and radial profiling of work, that invention which includes a rotatable spindle having a forward end and work support means on the forward end, circumferential profiling means rotatably mounted on the spindle and a carriage support mounted on the machine adjacent the spindle, a movable tool support carrier on the carriage support movable in a direction generally parallel to the spindle axis, a tool holder mounted in the tool support carrier for movement parallel to and radially of said spindle axis and the tool holder including longitudinal profiling means and including tracking means mounted between the circumferential profiling means and the longitudinal profiling means for simultaneously tracking both of the profiling means. The invention includes means in a turning machine or the like in which the tool axially and radially profiles work with at least two different patterns including, a first set of cooperating circumferential and longitudinal profiling means for forming a first control pattern, a second set of cooperating circumferential and longitudinal profiling means for forming a second controlled pattern, means for rotating the work on its longitudinal axis, means for moving the tool into engagement with the work and in the direction of the works longitudinal axis, means for operatively connecting said first and second sets of profiling means with said tool, and means for positioning said first set of profiling means relative to said second set of profiling means whereby when the work is rotated and the tool moved into engagement therewith, the work is profiled with at least said two different patterns according to the positioning of said first and second sets of cooperating circumferential profiling means.

35 Claims, 6 Drawing Figures

APPARATUS FOR TURNING MACHINES AND THE LIKE FOR SIMULTANEOUS AXIAL AND RADIAL PROFILING OF WORK

This invention relates more specifically to an apparatus for profiling work with complex patterns. More particularly this invention relates to the special turning of complex items such as pistons for internal combustion engines.

HISTORICAL BACKGROUND

Pistons for internal combustion engines have become increasingly complexed due to many factors including size, heat, and materials. As the piston tends to heat up, it tends to expand non-uniformly due to the difference in thickness of the metal in different parts of the piston. In order to get a proper seating in the cylinder for maintaining maximum compression, it is necessary to conform the piston so that when it is in its heated and operating state, it more nearly forms a perfect cylinder.

Typical of a machine for doing this type of work is that of De Biasse, U.S. Ser. No. 803,685 filed June 6, 1977 owned by the assignee of this application and such patented developments as Allan, U.S. Pat. No. 3,373,640 of Mar. 19, 1968 and Dall, U.S. Pat. No. 2,735,420 of Feb. 21, 1956. The invention disclosed in these items provide a rotating circumferential cam mounted on the spindle and some type of axial cam profiling means in some way connected therewith for providing a movement of the tool so that it will cut or machine a complex contour on the work both axially and radially.

Where very complexed profiles are required, it has been necessary in the past to perform the cutting operation in a series of stages rather than by a single continuous cut. Further, there has generally been a complex cam linkage between the circumferential cam on the spindle and the axial cam generally mounted parallel to the axis of the spindle. The longer the linkage the more problems in maintaining extreme accuracy as required in many pistons today.

OBJECTS AND SUMMARY

It is therefore an object of this invention to provide an apparatus for a turning machine or the like which provides for simultaneous axial and radial profiling of the work.

Another object of this invention is to provide apparatus for a turning machine or the like in which the means for tracking the circumferential and longitudinal profiling means eliminates complex linkaging thereby increasing the precision of the machine.

Still a further object of this invention is to provide apparatus for a turning machine or the like which includes a series of sets of cooperating profiling means in which the sets are positioned relative to each other so as to obtain different profiles on the same work.

A further object of this invention is to provide apparatus for a turning machine or the like in which the different sets of profiling means are so interconnected that the profile cut from one set blends harmoniously into the profile cut from the other set so that there is no obvious transition between one set of profiling means and the other set of profiling means.

Another object of this invention is to provide sets of profiling means in which each set comprises axial and radial profiling means.

A still further object of this invention is to provide apparatus for profiling work including means for profiling pistons for internal combustion engines.

Another object of this invention is to provide apparatus for turning machines or the like in which the profiling means is readily positioned and adjusted thereby reducing set-up time.

Yet a further object of this invention is to provide an attachment for turning machines or the like which can be mounted and removed from existing machines without difficulty.

Another object of this invention is to provide apparatus for a turning machine for complex profiling of work which is easy to operate and can be produced with a minimum of expense.

A still further object of this invention is to provide apparatus for a turning machine which allows for a rough and finished cut of the work during profiling operation.

Still a further object of this invention is to provide apparatus for turning machines or the like which can operate by means of fluid pressure such as hydraulic systems or the like.

A further object of this invention is to provide an apparatus for a turning machine which permits ease in change over from one to another and which includes means for operating the apparatus by numeric controls.

In summary therefore, this invention is directed to apparatus which will produce extremely accurate profiling on work by means of plural cooperating sets of cam systems heretofore not possible with existing systems and the above objects and others will be apparent from the following description and claims.

In the accompanying drawings which illustrate by way of example various embodiments of this invention:

FIG. 5 is an enlarged cross sectional view of the cam followers of FIG. 1.

GENERAL DESCRIPTION OF THE DRAWINGS

Figure 1:
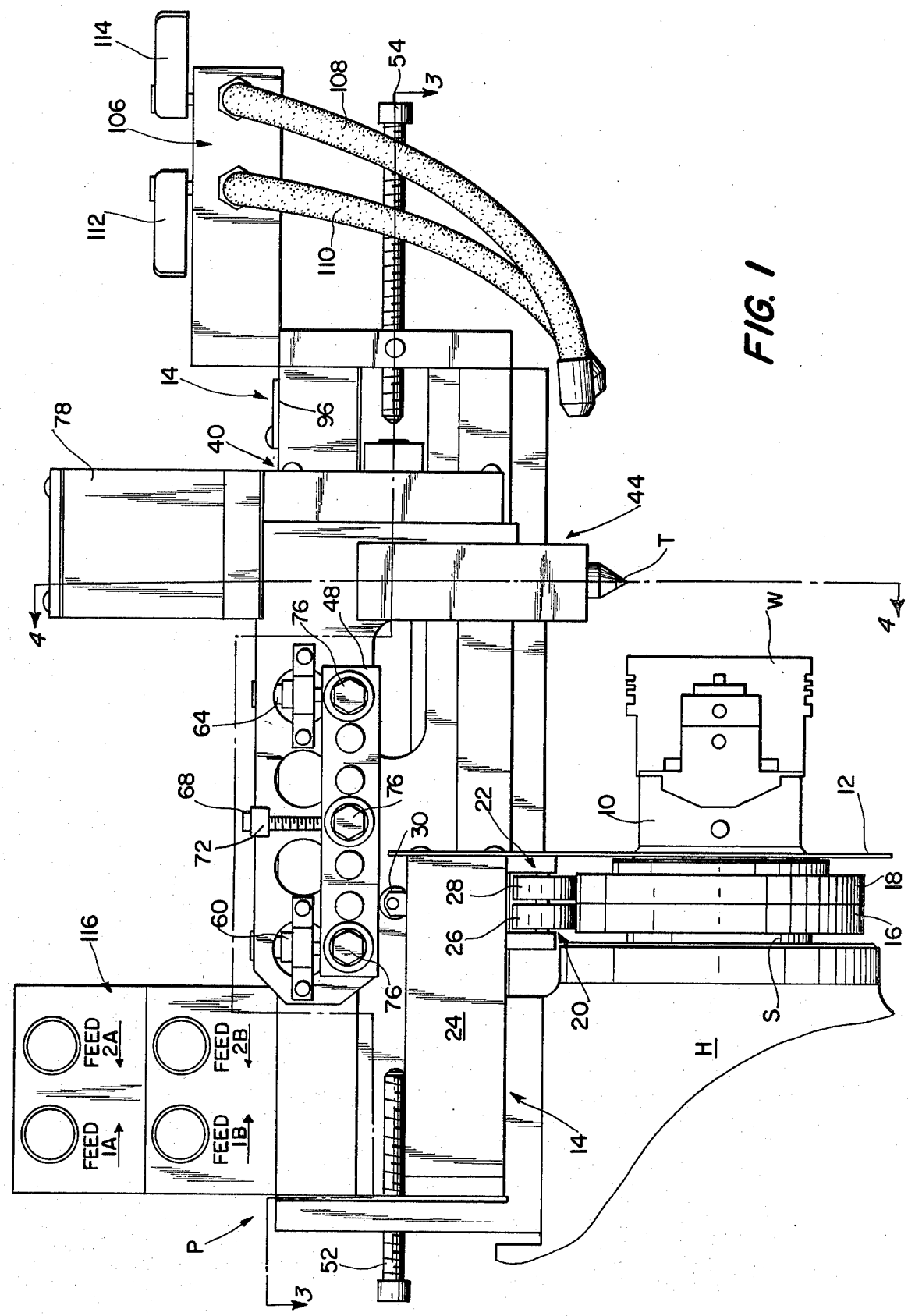
FIG. 1 is a side elevational view of the invention shown attached to the headstock of a turning machine with the work mounted on the spindle.
Figure 2:
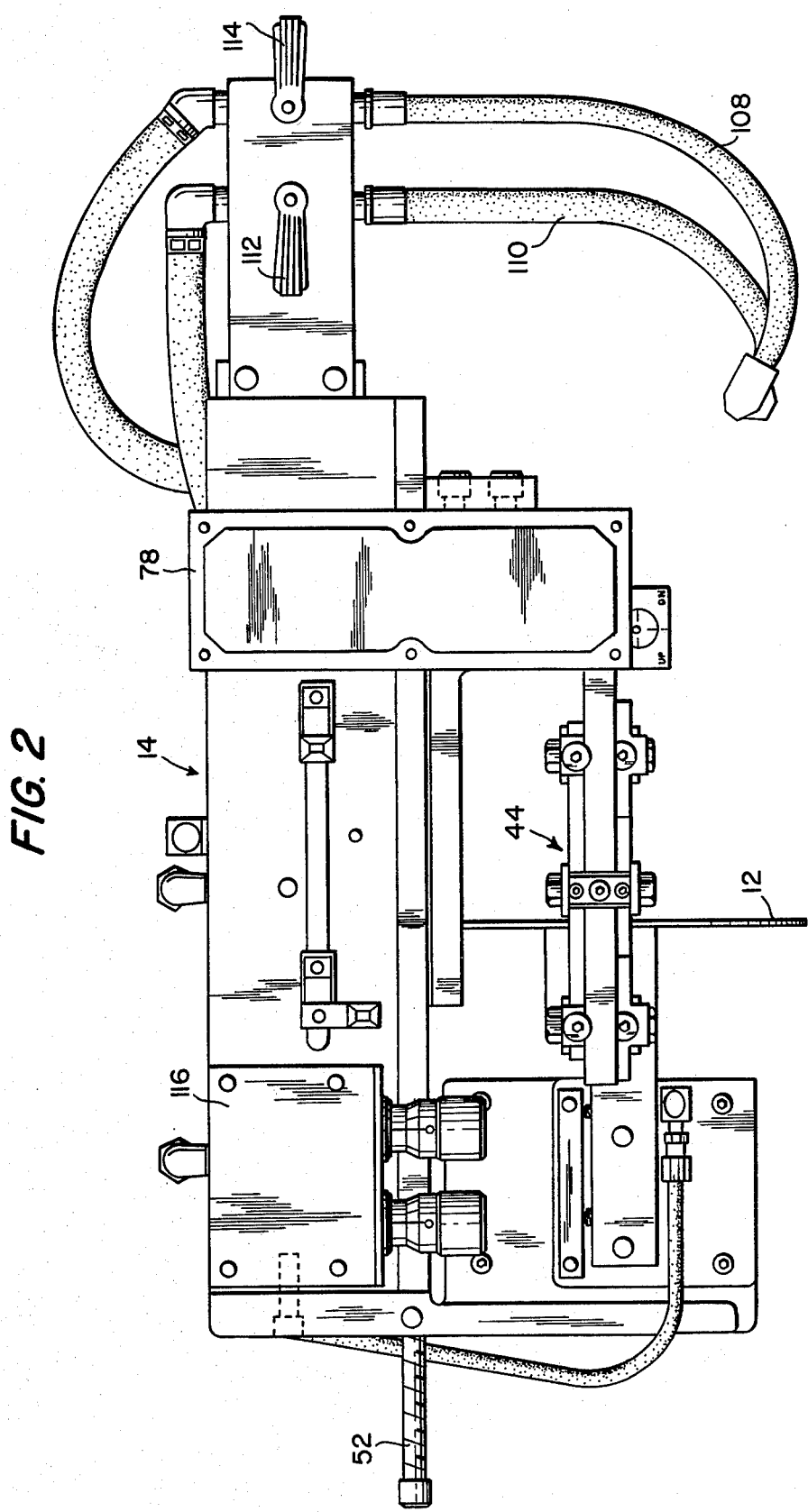
FIG. 2 is a top plan view of the invention.

As best illustrated in FIG. 1, the headstock H of the turning machine is shown having mounted thereon the piston profiling apparatus P.

The spindle S of the turning machine supports a work holder 10 on which is positioned the work W for machining. A metal chip guard 12 is secured to the piston profiling apparatus P. The metal chip guard is bolted or otherwise secured to the stationary carriage support 14 of the piston profiling apparatus P.

Mounted for rotation on the spindle S are a pair of circumferential cams 16 and 18 which are keyed and secured to the spindle S. The cams 16 and 18 are positively positioned with respect to each other and may be removed from the spindle for repositioning with respect to each other to change the profiling sequence as will be subsequently described. The stationary carriage support 14 has mounted thereon a pair of cam follower units 20 and 22 which respectively track circumferential cams 16 and 18. The cam follower units 20 and 22 are mounted in a lubricating block 24. The cam follower units 20 and 22 each include a circumferential cam follower such as 26 and 28 and an axial cam follower such as 30 and 32 as best shown in FIG. 5. It will be noted that the circumferential cam follower units 20 and 22 are positioned at right angles to the axial cam follower units 30 and 32.

Figure 3:
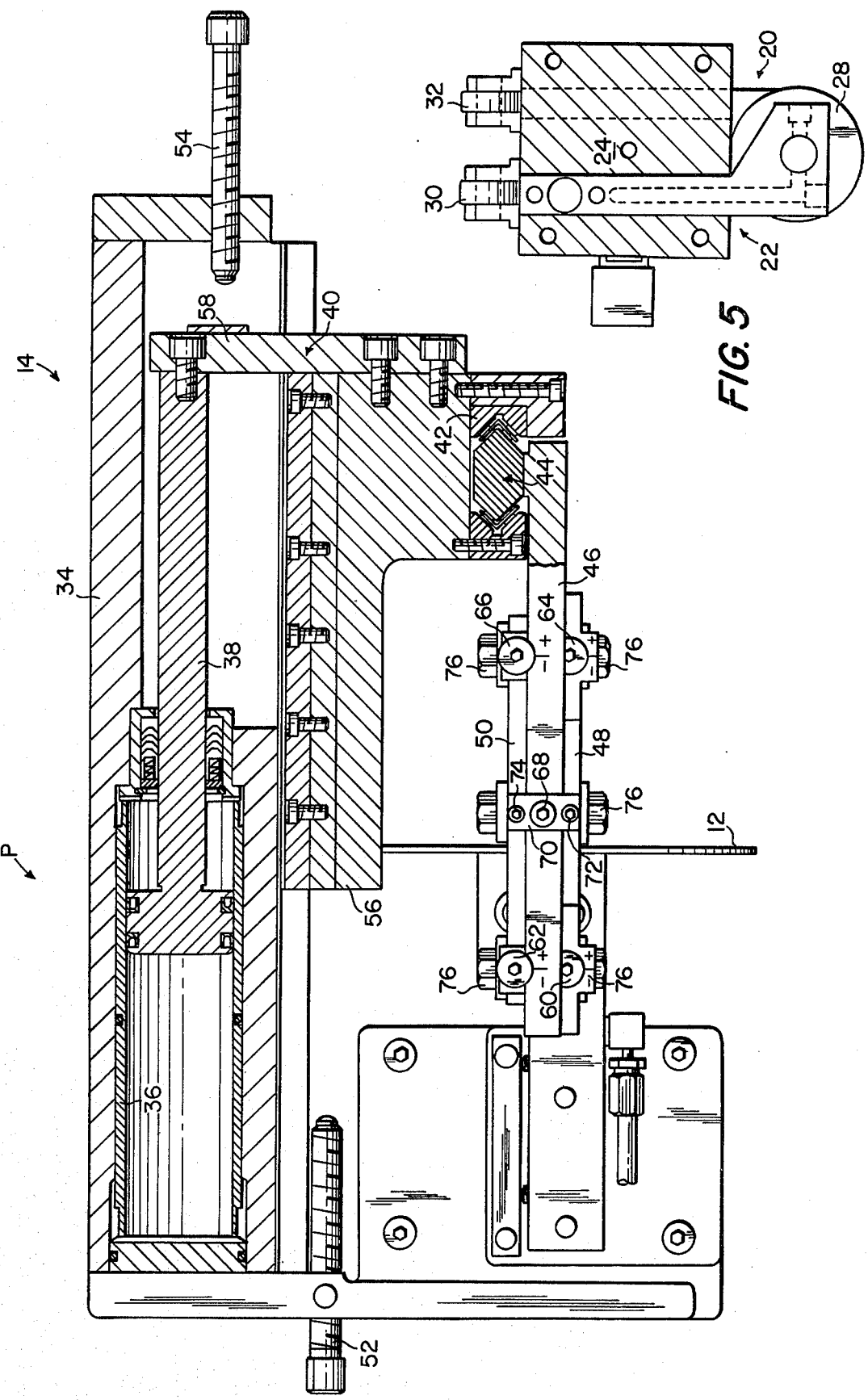
FIG. 3 is a top plan view of the invention similar to FIG. 2 but with a portion shown in section and taken along the line of 3—3 of FIG. 1 and viewed in the direction of the arrows.

Referring now to FIG. 3 it will be noted that the piston profiling apparatus P includes a housing 34 for the stationary carriage support 14. The housing 34 contains a cylinder 36 in which a piston 38 is hydraulically actuated. The end of the piston 38 supports a carriage 40. The carriage 40 is provided with a bearing block 42 in which is mounted the tool carrier 44. The tool carrier includes an arm 46 on which is mounted profile bars 48 and 50.

The stationary carriage support 14 has mounted on either end thereof adjustable stops 52 and 54. Stop 52 limits the rearward travel of the rear end 56 of the carriage 40. Stop 54 limits the travel of the forward end 58 of the carriage 40.

As shown in FIGS. 1 and 3, the profile bars 48 and 50 are adjustable by means of adjustment screw members 60, 62, 64 and 66. A mounting screw 68 passes through a saddle 70 and threads into the carrier arm 46. Saddle 70 is provided with screws 72 and 74 for positioning of the profile bars 48 and 50 on either side of the carrier arm 46. Lock nuts 76 are provided on both sides of the profile bars 48 and 50 for maintaining the profile bars 48 and 50 in fixed position after proper adjustment up or down with adjustment screws 60, 62, 64, and 66. Lateral adjustment can be made by shifting the profile bars 48 and 50 with respect to the lock nut 76 as the openings in the bars 48 and 50 allow for some movement.

Figure 4:
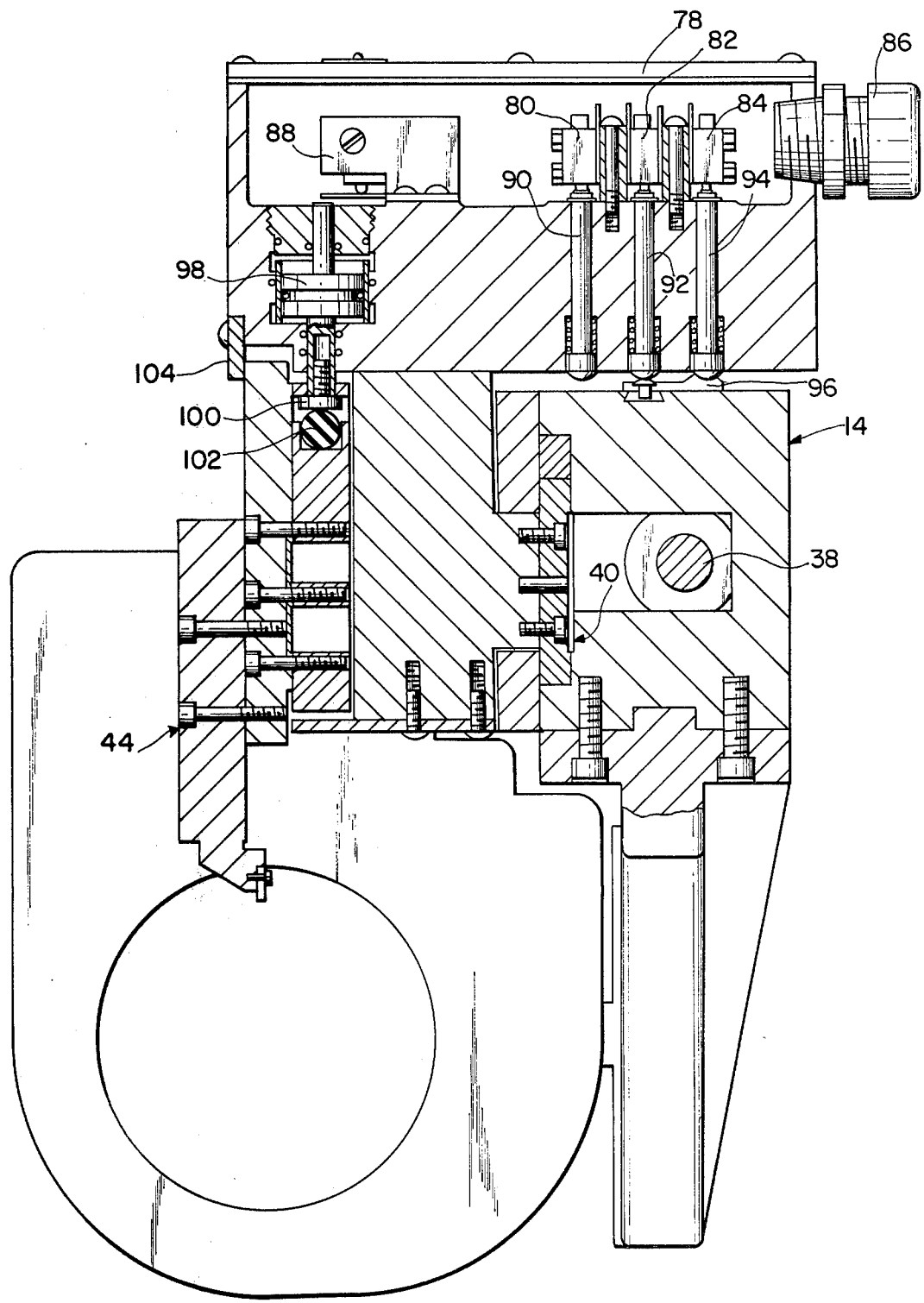
FIG. 4 is a cross sectional view taken along the line 4—4 of FIG. 1 and viewed in the direction of the arrows.

Carriage 40 as best shown in FIG. 4 has mounted on the top thereof a limit switch housing 78 provided with a series of limit switches 80, 82 and 84. A nipple 86 is provided to receive the electrical wiring for the various switches in the limit switch housing 78. Within the housing 78 is also a control switch 88. Limit switches 80, 82 and 84 are operated by plungers 90, 92 and 94 which engage various plunger operators such as 96 shown in FIGS. 1 and 4 which are mounted on the stationary carriage support 14. Control switch 88 is operated by a piston 98 which in turn is controled by air pressure. The piston 98 has a pad 100 which upon downward movement presses a rubber ball 102. The tool T mounted on the tool carrier 44 makes a rough cut when the piston 98 and pad 100 compress the ball 102 with light pressure. When heavier air pressure forces the piston down, the tool T is held more firmly in position against the work to give the work a very fine finish.

Housing 78 is provided with a guard cover 104 to prevent chips from getting underneath the tool carrier as it reciprocates in the bearing block 42.

Mounted on the end of the stationary carriage support 14 is a cooling unit 106 with nozzles 108 and 110 for directing a lubricant and cooling oil or the like against the work W and the cutting tool T to prevent over heating during machining operation. Control handles 112 and 114 control the amount of fluid to the nozzles 108 and 110.

On the stationary carriage support 14 is mounted a feed control panel 116. The feed control panel 116 can control movement of the carriage forward and in return modes in both a normal or fast speed as desired by the operator. Electrical control systems, hydraulic control systems, air pressure control systems and lubricating and coolant systems (not shown in detail) are provided as necessary.

OPERATION

The operation of the profiling apparatus P is as follows:

The circumferential cam 16 and 18 are positioned on the spindle S in a definite spaced relation with each other as determined by the type of circumferential profile desired on the work. The axial profile bars 48 and 50 are also positioned on the tool carrier 44 with specific profiles as desired along the longitudinal axis of the work W. The axial cam follower units 30 and 32 engage the profile cam bars 48 and 50. Simultaneously the circumferential cam followers 26 and 28 engage the circumferential cams 16 and 18 respectively. It will now be obvious that as the cutting tool T moves axially with respect to the work W, it will impart a radial profile on the work simultaneous with the axial profile depending upon which of the cam followers are engaging the respective cams of a set.

Figure 6:
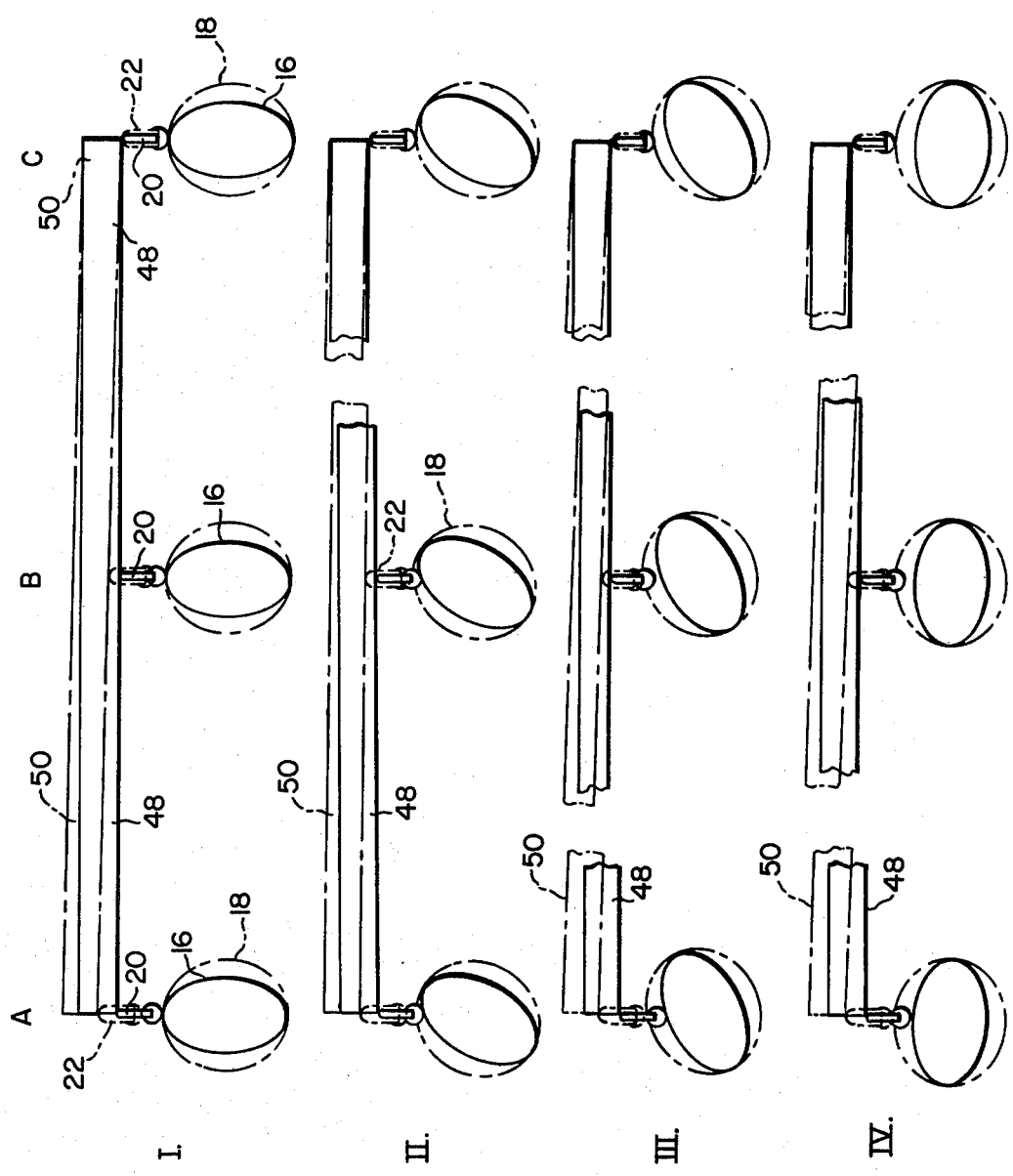
FIG. 6 is a schematic showing the operation of the two sets of profiling means.

Referring now to FIG. 6 which shows a schematic illustration of the cam operator systems, it will be noted that profile bars 48 and 50 are set at different elevations. This adjustment of the profile bars can be done on the tool carrier 44 by means of the various adjustment screws 60, 62, 64 and 66. The circumferential cams 16 and 18 are graphically illustrated in that 16 is shown in solid lines and 18 is shown in broken lines. Axial profile cam 48 is shown in solid lines and axial cam 50 in broken lines.

Referring now to the A stage at the left hand side of FIG. 6, we will now track the cams through 90 degrees through four successive positions beginning with I and ending with IV. It will now be noted that cam follower unit 20 through 90 degrees is always in contact with circumferential cam 16 and axial cam 48. If now we shift to area B in the center of FIG. 6, and we proceed through 90 degrees from I through IV, we note that initially cam follower unit 20 is in contact with circumferential cam 16 and axial cam 48. As we rotate 90 degrees, it will be now obvious that follower unit 20 will be superseded by follower unit 22 which will then be tracking on circumferential cam 18 and profile cam 50. Similarly, if we go to position C on the right hand side of FIG. 6 through 90 degrees and I through IV, we will note that in this position, initially in the position of I both cam follower units 20 and 22 are in contact with both cams 16 and 18 as well as both axial cams 48 and 50. As we go through 90 degrees, it will be noted that tracking will be done only on circumferential cam 18.

It will now be obvious that more than two profile sets can be used to obtain many different combinations on the work W. For purpose of illustration only two are shown but the number of circumferential cams mounted on the spindle can be increased as well as the number of profile bars. Such a system allows for a very smooth transition from one cam set to the other cam set without any scoring or marking of the work during the transition. It will further be obvious that very complex cuts can be made on the work simultaneously without a separate series of machining operations.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

Having thus described my invention, what I claim is:

1. In a turning machine having a tool for simultaneous axial and radial profiling of work:
   (a) a rotatable spindle having a forward end and having work support means on said forward end;
   (b) circumferential profiling means rotatably mounted on said spindle;
   (c) a carriage support mounted on said machine adjacent said spindle;
   (d) a movable tool support carrier on said carriage support movable in a direction generally parallel to said spindle axis;
   (e) a tool holder mounted in said tool support carrier for movement parallel to and radially of said spindle axis;
   (f) said tool holder including longitudinal profiling means;
   (g) tracking means mounted between said circumferential profiling means and said longitudinal profiling means and simultaneously tracking both of said profiling means.

2. In a turning machine as in claim 1 and wherein:
   (a) said tracking means has its longitudinal axis transverse to the axis of said spindle.

3. In a turning machine as in claim 1 and wherein:
   (a) said tracking means has ends and includes at least two cam followers;
   (b) one of said at least two cam followers being at one end of said tracking means and engaging said circumferential profiling means; and
   (c) the other of said at least two cam followers being at the other end of said tracking means and engaging said longitudinal profiling means.

4. In a turning machine as in claim 3 and wherein:
   (a) said tool holder longitudinal profiling means extends rearwardly of said work support means.

5. In a turning machine as in claim 4 and wherein:
   (a) said tool holder longitudinal profiling means extends rearwardly of said circumferential profiling means.

6. In a turning machine as in claim 5 and wherein:
   (a) said tool holder longitudinal profiling means includes linear adjustment means.

7. In a turning machine as in claim 6 and wherein:
   (a) said tool holder linear adjustment means includes two direction adjustment means.

8. In a turning machine as in claim 7 and wherein:
   (a) said movable tool support carrier includes an hydraulic operator means.

9. In a turning machine as in claim 8 and wherein:
   (a) said hydraulic operator means includes a piston having its axis parallel to said spindle axis.

10. In a turning machine as in claim 8 and including:
    (a) means associated with said tool holder for varying the pressure on said tool.

11. In a turning machine as in claim 10 and including:
    (a) means associated with said tool holder for producing rough and finished cuts.

12. In a turning machine as in claim 10 and wherein:
    (a) said means for varying pressure includes a fluid pressure piston means.

13. In a turning machine as in claim 12 and wherein:
    (a) said fluid pressure piston means includes a compressible ram.

14. In a turning machine as in claim 13 and wherein:
    (a) said fluid pressure piston means has its longitudinal axis generally transverse to said spindle axis.

15. In a turning machine having a tool for simultaneous axial and radial profiling of work:
    (a) a rotatable spindle having work support means;
    (b) a plurality of circumferential profiling means rotatably mounted on said spindle;
    (c) a stationary carriage support mounted on said machine;
    (d) a movable carriage mounted on said stationary carriage support for movement in a direction generally parallel to said spindle axis;
    (e) a movable tool carrier mounted on said movable carriage and movable radially and axially of said spindle axis;
    (f) a plurality of longitudinal profiling means mounted on said movable tool carrier;
    (g) means for selectively following at least one of said plurality of circumferential profiling means and at least one of said plurality longitudinal profiling means;
    (h) whereby when said work is supported on said work support means and said spindle is rotated, said profiling tool upon engaging said work, will contour said work as determined by said selected circumferential and longitudinal profiling means of said plurality of circumferential and longitudinal profiling means.

16. In a turning machine as in claim 15 and wherein:
    (a) said plurality of circumferential profiling means includes at least two annular cams mounted on said spindle.

17. In a turning machine as in claim 16 and wherein:
    (a) said plurality of longitudinal profiling means includes at least two linear cams mounted on said movable tool carrier.

18. In a turning machine as in claim 17 and wherein:
    (a) said means for selectively following said circumferential and longitudinal profiling means includes at least two sets of roller tracking means.

19. In a turning machine as in claim 16 and wherein:
    (a) each one of said plurality of circumferential profiling means has its own cooperating one of said plurality of longitudinal profiling means thereby providing a cooperating profiling pair; and,
    (b) said means for selectively following said circumferential and longitudinal profiling means includes a separate cooperating tracking roller means for each cooperating profiling pair.

20. In a turning machine as in claim 19 and wherein:
    (a) each of said cooperating tracking roller means includes a pair of tracking rollers mounted at substantially right angle to each other.

21. In a turning machine as in claim 16 and wherein:
    (a) said movable tool carrier includes means for controlling the tool pressure.

22. In a turning machine as in claim 15 and including:
    (a) travel limit means in said stationary carriage support for limiting the travel of said movable tool carrier.

23. In a turning machine as in claim 22 and including:

(a) adjustment stop means in said stationary carriage support for said movable tool carrier.

24. In a turning machine as in claim 21 and wherein:
(a) said movable tool carrier includes a pair of V-shaped vertical bearing means; and,
(b) said movable carriage includes opposed guide ways for receiving said V-shaped vertical bearing means.

25. In a turning machine as in claim 15 and including:
(a) chip guard means mounted in front of said circumferential profiling means.

26. In a turning machine having a tool for simultaneous axial and radial profiling of work with at least two different patterns:
(a) a first set of cooperating circumferential and longitudinal profiling means for forming a first controlled pattern;
(b) a second set of cooperating circumferential and longitudinal profiling means for forming a second controlled pattern;
(c) means for rotating said work on its longitudinal axis;
(d) means for moving said tool into engagement with said work and in the direction of said work's longitudinal axis;
(e) means for operatively connecting said first and second sets of profiling means with said tool;
(f) means for positioning said first set of profiling means relative to said second set of profiling means; and,
(g) whereby when said work is rotated and said tool moved into engagement therewith, said work is profiled with at least said two different patterns according to the positioning of said first and second sets of cooperating circumferential profiling means.

27. In a turning machine as in claim 26 and wherein:
(a) said first and second sets of profiling means each include a rotating cam and a linearly traveling cam and cam follower means positioned between said rotating and linearly traveling cams.

28. In a turning machine as in claim 26 and wherein:
(a) said circumferential profiling means are mounted for rotation on said work rotating axis.

29. In a turning machine as in claim 27 and including:
(a) means for longitudinally shifting said longitudinal profiling means of each set with respect to its respective circumferential profiling means of said set.

30. In a turning machine as in claim 29 and wherein:
(a) said tool moving means includes a fluid piston for regulating tool pressure.

31. In a turning machine as in claim 26 and wherein:
(a) said means for positioning includes adjustment means.

32. In a turning machine as in claim 26 and including:
(a) carriage means for supporting each of said longitudinal profiling means relative to each of said circumferential profiling means.

33. In a turning machine as in claim 32 and wherein:
(a) said carriage means includes fluid means for shifting said longitudinal profiling means.

34. In a turning machine as in claim 33 and including:
(a) stop means for said carriage means.

35. In a turning machine as in claim 34 and including:
(a) means for controlling the speed of said carriage.

* * * * *